United States Patent
Pollack et al.

(10) Patent No.: US 6,719,497 B1
(45) Date of Patent: Apr. 13, 2004

(54) SUBSEA ANCHOR LINE CONNECTION METHOD AND CONNECTOR FOR USE THEREIN

(75) Inventors: Jack Pollack, Monaco (MC); Michael Macrae, Ville-France-sur-Mer (FR); Rene Perratone, Menton (FR)

(73) Assignee: Offshore Energy Development Corporation, Monaco (MC)

( * ) Notice: Subject to any disclaimer, the term of this patent is extended or adjusted under 35 U.S.C. 154(b) by 0 days.

(21) Appl. No.: 10/111,603

(22) PCT Filed: Nov. 1, 2000

(86) PCT No.: PCT/EP00/10967

§ 371 (c)(1),
(2), (4) Date: Sep. 16, 2002

(87) PCT Pub. No.: WO01/32501

PCT Pub. Date: May 10, 2001

(30) Foreign Application Priority Data

Nov. 1, 1999 (EP) .............................................. 99203595

(51) Int. Cl.[7] .......................... B63B 21/00; B63B 2/20; F16G 15/04; F16G 15/06; B66C 1/66
(52) U.S. Cl. ............. 405/224; 114/230.26; 114/230.29; 294/82.21; 294/82.22; 294/82.23
(58) Field of Search ............................. 405/224, 224.1; 114/293, 230.1, 230.2, 230.26, 230.29, 230.3; 294/82.11, 82.21, 82.22, 82.23

(56) References Cited

U.S. PATENT DOCUMENTS

| | | | |
|---|---|---|---|
| 1,392,260 A | 9/1921 | Schollar ................... 294/82.24 |
| 4,067,282 A | 1/1978 | Guinn et al. ............. 114/230.2 |
| 4,155,673 A | * 5/1979 | Yashima ..................... 405/224 |
| 4,303,037 A | * 12/1981 | Helveston et al. ..... 114/230.23 |
| 4,351,258 A | 9/1982 | Ray et al. .............. 114/230.24 |
| 4,417,830 A | 11/1983 | Shotbolt ..................... 405/169 |
| 4,509,448 A | 4/1985 | Pease et al. ................. 114/293 |
| 5,061,131 A | * 10/1991 | Petty et al. ................. 405/224 |
| 5,244,243 A | 9/1993 | Grayson et al. .............. 294/89 |
| 5,779,226 A | 7/1998 | Wudtke ...................... 254/278 |
| 5,997,374 A | * 12/1999 | Pollack .......................... 441/3 |
| 6,170,424 B1 | * 1/2001 | Boerseth ..................... 114/293 |
| 6,223,671 B1 | * 5/2001 | Head ....................... 114/230.2 |

FOREIGN PATENT DOCUMENTS

| | | |
|---|---|---|
| FR | 1 600 191 | 7/1970 |
| GB | 2 301 860 | 12/1996 |
| JP | 8-20381 | 1/1996 |
| JP | 8-20382 | 1/1996 |
| WO | WO 98/57842 | 12/1998 |

OTHER PUBLICATIONS

NN.: "'Doris' Drilled Piles For Heavy Duty Anchorages", IHC Holland Oil Report, No. 13, 1971, pp 8–9.

* cited by examiner

*Primary Examiner*—Heather Shackelford
*Assistant Examiner*—Tara L. Mayo
(74) *Attorney, Agent, or Firm*—Young & Thompson

(57) ABSTRACT

A method of mooring a vessel to a subsea anchoring element (1) connected to the seabed, and comprising a chain section (3) which is not longer than half the water depth, and which is at or near its free end provided with a coupling member (4), is characterised by the steps of: lowering a multi-strand anchor line (9) from a vessel (8), the multi-strand anchor line (9) being at its free end attached to a connector (10), and attaching the connector (10) to the coupling member (4). The present disclosure also provides an anchor line repair or exchange method comprising the steps of: disconnecting the first multi-strand anchor line (16) from the chain section, lowering a second multi-strand anchor line (9) from a vessel (8), the second multi-strand line (9) being at its free end attached to connector (10), and attaching the connector (10) of the second multi-strand line (9) to the coupling member (4).

9 Claims, 5 Drawing Sheets

Fig 7
Fig 8
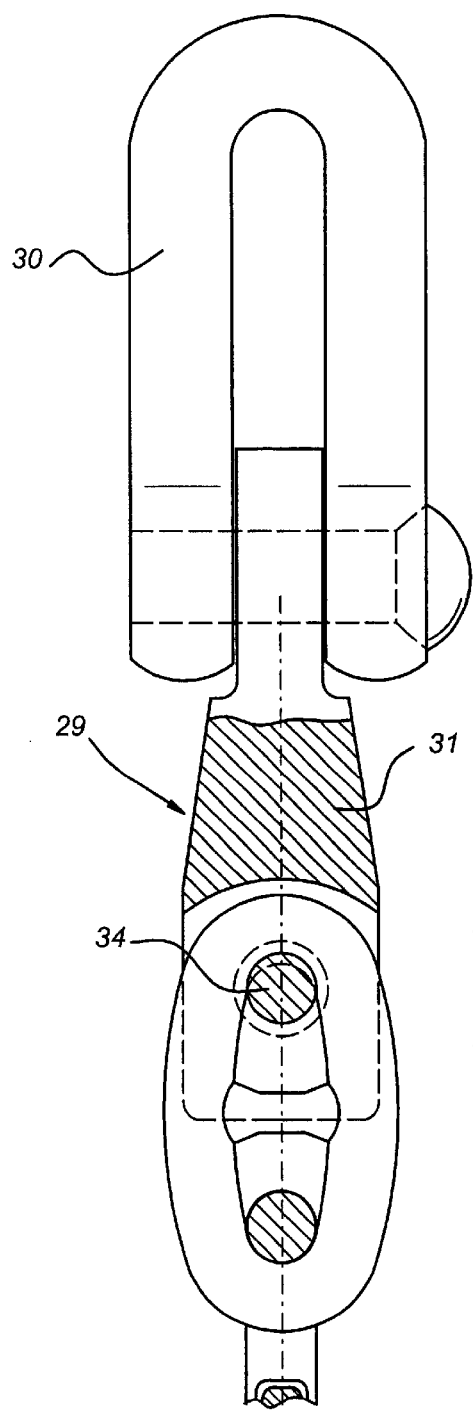
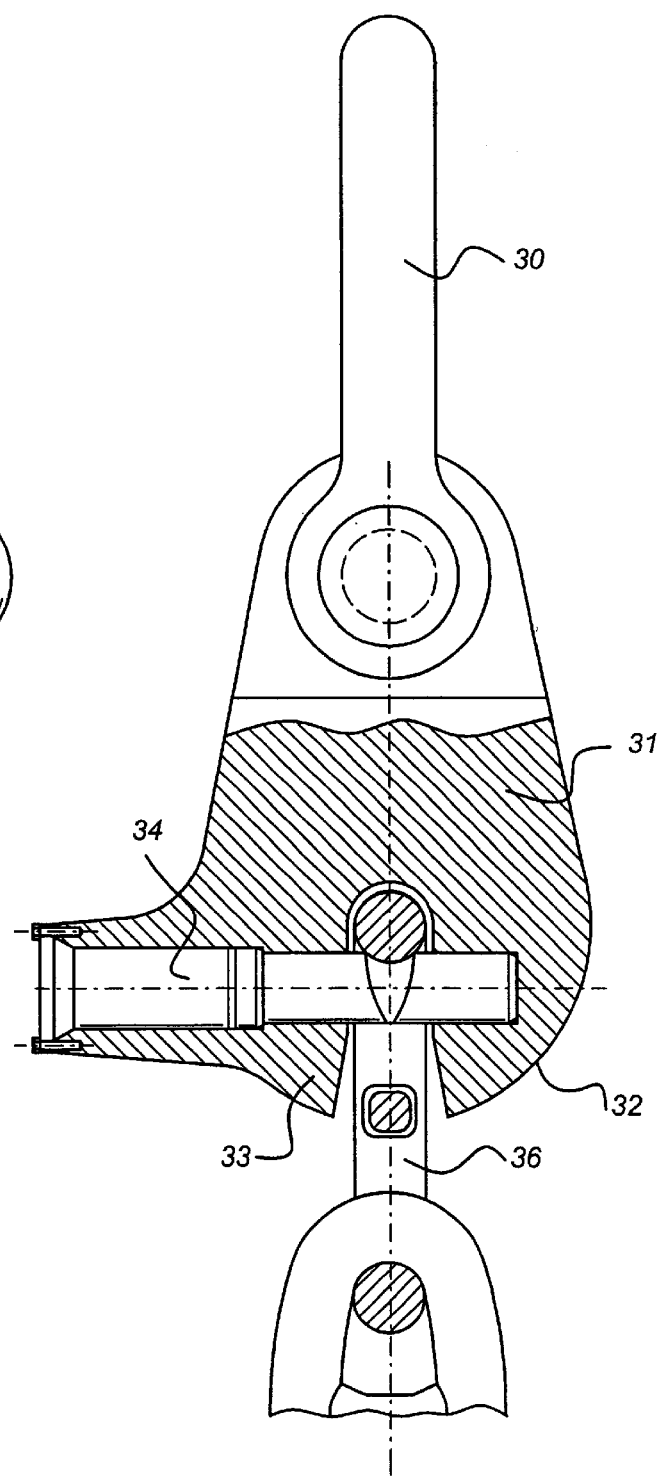

SUBSEA ANCHOR LINE CONNECTION METHOD AND CONNECTOR FOR USE THEREIN

BACKGROUND OF THE INVENTION

The invention relates to a method of mooring a vessel to a subsea-anchoring element, which is connected to the seabed, comprising the step of connecting the anchoring element to the seabed, the anchoring element comprising a chain section which is not longer than half the water depth, the chain section being at or near its free end provided with a coupling chain member. The invention also relates to a subsea anchor line exchange and/or repair method and to a subsea connector for use in said method.

DESCRIPTION OF THE RELATED ART

From WO-98/57842 it is known to moor a vessel to the seabed via a suction anchor at the end of which a relatively short chain section is connected. The chain section, which can withstand the abrasive forces acting at the mudline of the anchor upon movements of said chain section, is at its free end connected to a sheave through which a looped multi-strand anchor line, such as a polyester or steel wire cable, runs. The looped anchor line is near the installation vessel connected to a triangular plate, one side of which is attached to a winch. The looped anchor line can easily be replaced by attaching a new anchor line to the old line and taking in the looped anchor line from one side. The known method is especially suitable for repair of anchor lines used in deep water, such as water over 300 meters in depth or more. Although the known system is useful for exchange of the anchor lines without diver intervention, the looped mooring lines will already be put in place upon mooring of the vessel. If the multi-strand anchor lines remain attached in an untentioned state for a longer period, which may pass between installation of the anchor and mooring of the vessel to said anchor line, the wave and current-induced motions in the slack anchor lines may result in damage to the multi-strand lines.

Also during lowering of the suction anchor and the multi-strand line, a risk of twisting of the deployment line and the looped end of the mooring leg may occur, especially in deep water systems.

From IIR's conference on moorings and anchors, Aberdeen October 1998, a suction caisson is known which is lowered to the seabed and installed therein, the mooring line being attached to a central deployment pad eye. When the suction caisson has been installed, the subsea connector (female part) at the end of the mooring line is detached via a remote operated vehicle (ROV) and is transferred to the mooring pad eye (male part)which is offset from the centreline of the caisson and which is attached at the end of a short stiff cable that is connected to a side of the suction caisson. As the mooring line is used for deployment of the caisson, it is not possible to pre-install the caisson and to moor the vessel at a later stage. The female part, which is very heavy, can not be tilted by the ROV so it can only receive the male part when it is in a vertical position. The function of the short stiff cable is basically to keep the mooring pad eye (male part) in an upright position. If the cable is to long, the male part would bend over and no connection with the female part is possible.

The known construction is only applicable for temporary mooring of semi-submesibles and is not intended for long-term use, due to the fact that the cable, needed to uphold the male part, is very sensitive to abrasion as it lies completely in the mudline.

Also disconnection/change out of the mooring line is not possible as after installation the connection itself will be lying in the mud, not reachable by the ROV.

From U.S. Pat. No. 4,067,282 an anchoring system is known having a quick disconnect chain element in the form of an explosive link, that can be released during high seas. The anchor chains are released near their mid-parts thereof and can be reconnected above water level.

From FR-1 600 191 it is known to lower a female connector along a pilot line to a pre-installed anchor on the seabed having a rope anchor line part of short length which terminates in a male connector plug. The female connector is coupled to a multi-strand anchor line. The known connector is activated by springs that lock the female part around the male part. With the known system it is not possible to change out or repair an existing damaged or worn multi-strand anchor line by attaching a new multi-strand line to the male connector of the relatively short anchor line part.

SUMMARY OF THE INVENTION

It is an object of the present invention to provide a versatile mooring method and anchor line repair method for use in deep water in which a multi-strand mooring line can be attached to an anchoring point at a desired moment in time after installation of the anchor.

It is a further object to provide a mooring system in which the anchor point can be installed in a relatively easy manner.

It is a further object of the present invention to provide a mooring line repair method for deep water, such as water depths of 200 meters or more, by which anchor lines can be easily exchanged and/or repaired.

Thereto the method according to the present invention is characterised by the steps of:

lowering a multi-strand anchor line from a vessel, the multi-strand anchor line being at its fee end attached to a connector, the connector comprising an eye that is attached to the multi-strand line, a connector body comprising two spaced apart wall parts that define a recess there between for accommodating the coupling chain member, and a closing member being movable with respect to the connector body, the closing member being slidable to bridge the space between the wall parts.

attaching the connector to the coupling chain member by placing the chain member between the wall parts and operating the closing member to bridge the space between the wall parts.

By first installing the anchor point and subsequently attaching a multi-strand line, the anchor can be lowered without a need to overboard and control the deployment of the chain-wire connection. During the lowering of the anchor there is no risk that twisting of the deployment wire and the mooring leg will occur as only the deployment wire is used on installation of the anchor. This is of particular significance in deep water systems wherein taut mooring system installation normally requires the use of two vessels, one to lower the anchor and the second to establish a large offset while deploying the mooring leg. The present method reduces the complexity of the installation.

By pre-installing of the anchor points, a large degree of flexibility in vessel scheduling is obtained and fabrication schedules for the anchor points and the mooring leg components may be carried out consecutively.

Pre-installing of the anchor points reduces the need to ensure that the multi-strand lines attached to the anchor points while no mooring occurs, come into contact with the seabed and maintain a minimum tension until hook-up. Because the special connector used according to the invention, the multi-strand line can be attached to a chain-link or a chain-like connecting element of the chain section attached to the anchor. Hereby it is possible to attach a new multi-stand line upon installation but also to exchange existing multi-strand lines that have been damaged or which are at the end of their technical service life. During such an exchange, the old multi-strand line may be cut off or may remain attached to the chain section, the new multi-strand line being coupled to the chain connecting member or to a chain link of the chain section. Because of the chain-compatible construction and simple operation of the connector employed in the present invention, the majority of existing deep water anchoring system which employ a relatively short chain section connected to the anchor and a multi-strand anchor line connected to the chain section, can be installed and or replaced. It is possible to attach a guide wire to the chain section, for instance by a ROV or via the first multi-strand line, a cutting element being lowered along the guide wire to cut the chain downstream from the first multi-strand anchor line. Thereafter the subsea connector with the second multi-strand line for replacement of the first line can be lowered. This can be done along the guide wire. The second multi-strand line is attached via the subsea connector, for instance via intervention of a ROV. It is also possible to guide the new multi-strand anchor line towards the chain section via the first multi-strand line, that needs to be replaced, such that the connector of the second line is guided towards the chain section in an easy manner.

A suitable connector for use in the method of the present invention comprises a shackle for attaching to a multi-strand line and a connector body comprising two spaced apart wall parts defining a recess therebetween for accommodating a chain link, and a closing member being movable with respect to the wall parts, the closing member being rotatable or slidable to bridge the space between the wall parts. The closing member may be hydraulically actuated from the vessel, or hydraulically or mechanically from a ROV.

BRIEF DESCRIPTION OF THE DRAWINGS

The method and connector according to the invention will be described in detail with reference to the accompanying drawings. In the drawings.

DESCRIPTION OF THE PREFERRED EMBODIMENTS

Figure 1A:
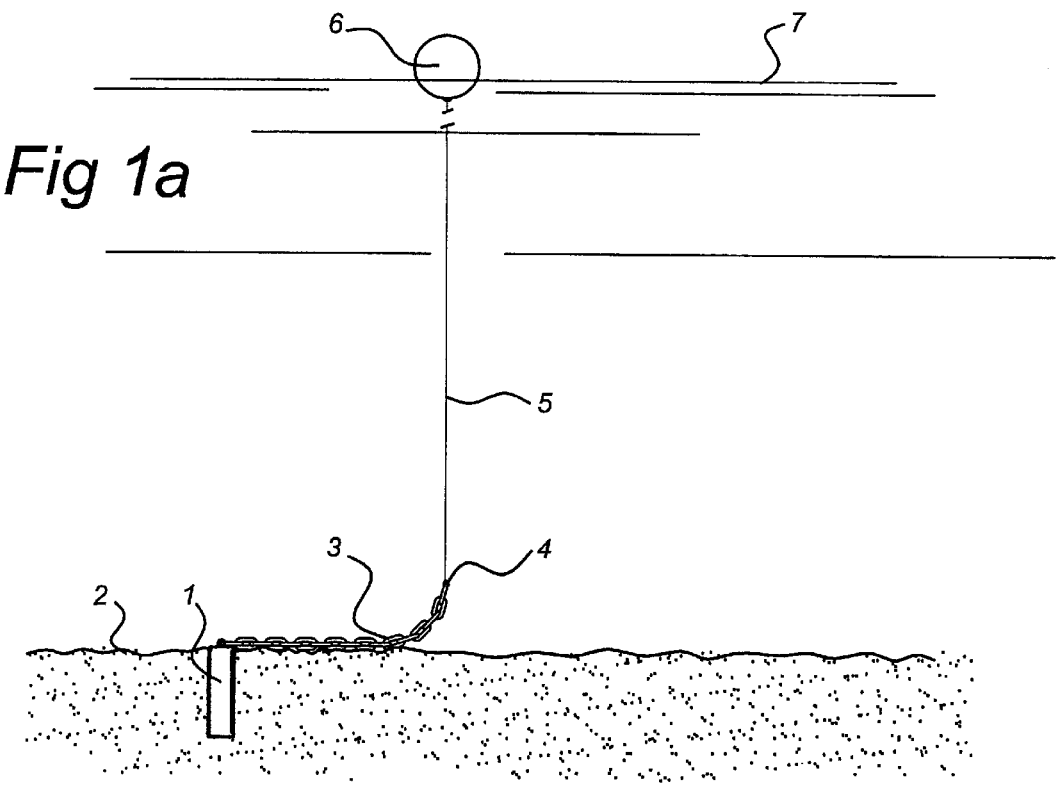
FIGS. 1a and 1b show a method of connecting an anchor line using a guide wire and a ROV.

FIG. 1a shows an anchor 1, such as a suction anchor 1, which has been introduced into the seabed 2. A short chain section 3 is attached to the anchor 1 and lies partly in the seabed and partly on the seabed, near the anchor 1. The chain section 3 is resistant to the abrasive action of movements in the seabed when it is drawn through the mudline. At the end of the chain section 3 a coupling member 4 is provided, which may be one of the links of the chain section or which may be a separate eye of larger diameter than the chain links. A guidewire 5 connects the chain section 3 to a buoy 6 at water surface 7. The guidewire 5 may also be used as deployment line for lowering the anchor 1 to the seabed 2.

Figure 1B:
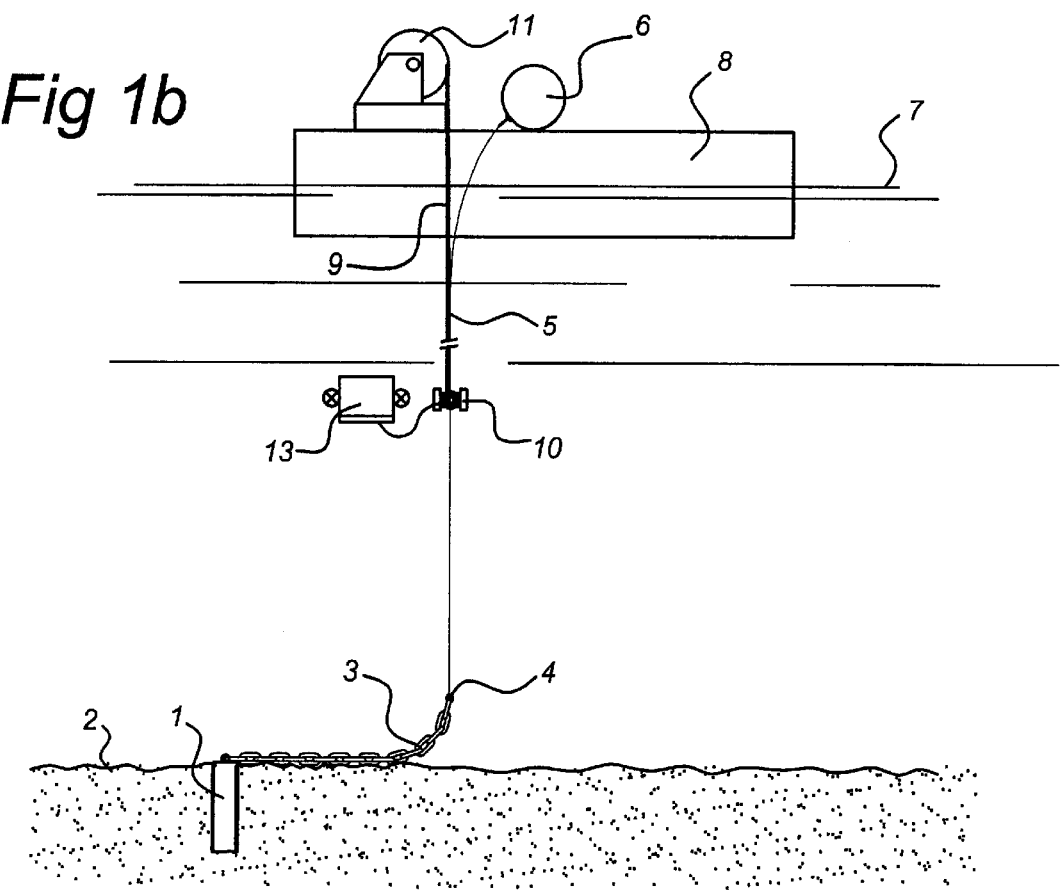

As shown in FIG. 1b, the installation vessel 8 for installing multi-strand anchor line 9 recovers the buoy 6. A connector 10, that is attached to the end of anchor line 9, is lowered along the guidewire 5 towards the coupling member 4 of the chain section 3. The connector 10 may be hydraulically actuated by a remote operated vehicle (ROV) 13 and may comprise guiding elements to displace the connector 10 along the guidewire 5. Upon lowering, of the connector 10, the anchor line 9 is unwound from a winch 11 on the installation vessel 8. The multi-strand line could be a steel wire, a synthetic rope like polyester, nylon, dyneema etc. The multi-strand line could also be made as a composite which comprises segments made out of different materials, for example a mooring line with a combination of steel wire and a polyester rope. After attachment of the connector 10 to the coupling member 4, the guide wire 5 will be removed from the connector. The ROV 13 is provided with a tv-camera and operating tools that are controlled from the vessel 8 to position the connector 10 with respect to the coupling member 4, to close the connector and to remove the guide wire 5.

Figure 2:
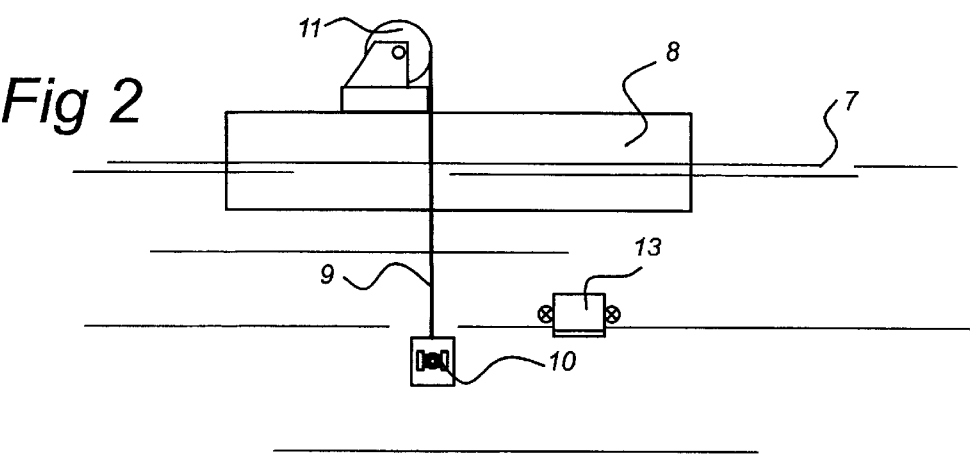
FIG. 2 shows a preferred method of connecting an anchor line to a pre-installed anchor only using a ROV.

FIG. 2 shows a similar installation method as shown in FIGS. 1a and 1b, without using a guidewire 5. The end of the multi-strand line 9 is attached to a connector 10, which is guided by the ROV 13 towards the coupling member 4. The end of chain section 3 is held above a buoy 12 (or above a mud mat, not shown) to be clear from the mud line and in an orientation to allow the connection 10 to vertically stab onto the end chain link 4.

Figure 3:
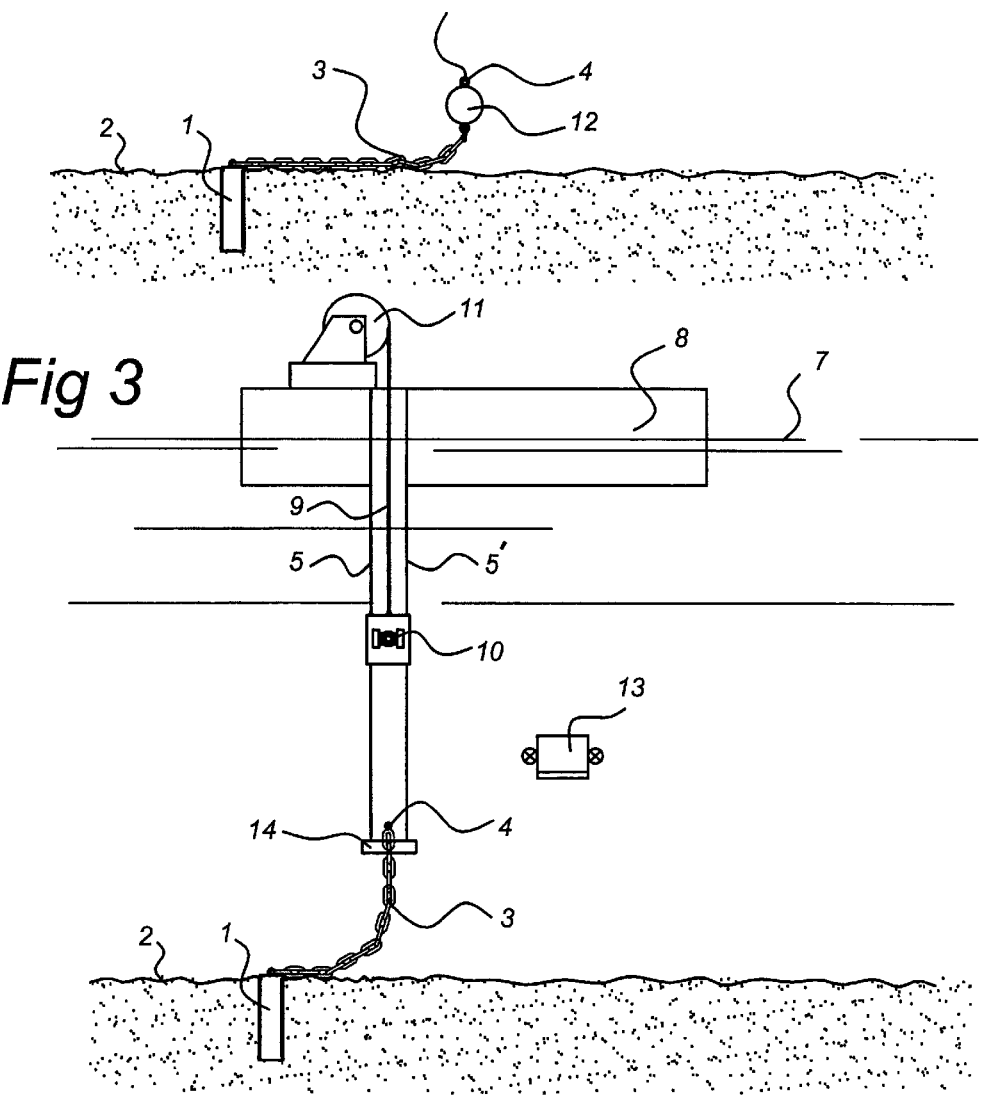
FIG. 3 shows an anchor line connecting method according to the present invention using a combination of a guidewire and a workbench, FIG. 4 schematically shows an anchor line repair- and/or change out method according to the present invention, FIGS. 5 and 6 respectively show a partly cut away sideview and a frontal view of a first embodiment of the subsea connector according to the present invention, and FIGS. 7 and 8 respectively show a partly cut away sideview and a frontal view of a second embodiment of a subsea connector according to the present invention.

FIG. 3 shows an installation method employing a double guide wire 5, 5'. From the installation vessel 8, the connector 10 may be lowered along the guidewires 5, 5'. At the bottom end of the guidewires 5, 5' a workbench 14 is provided that is connected to the coupling member 4 of the chain section 3. By the workbench 14, the coupling member 4 is securely positioned and can therefore be more easily connected to the connector 10.

Figure 4:
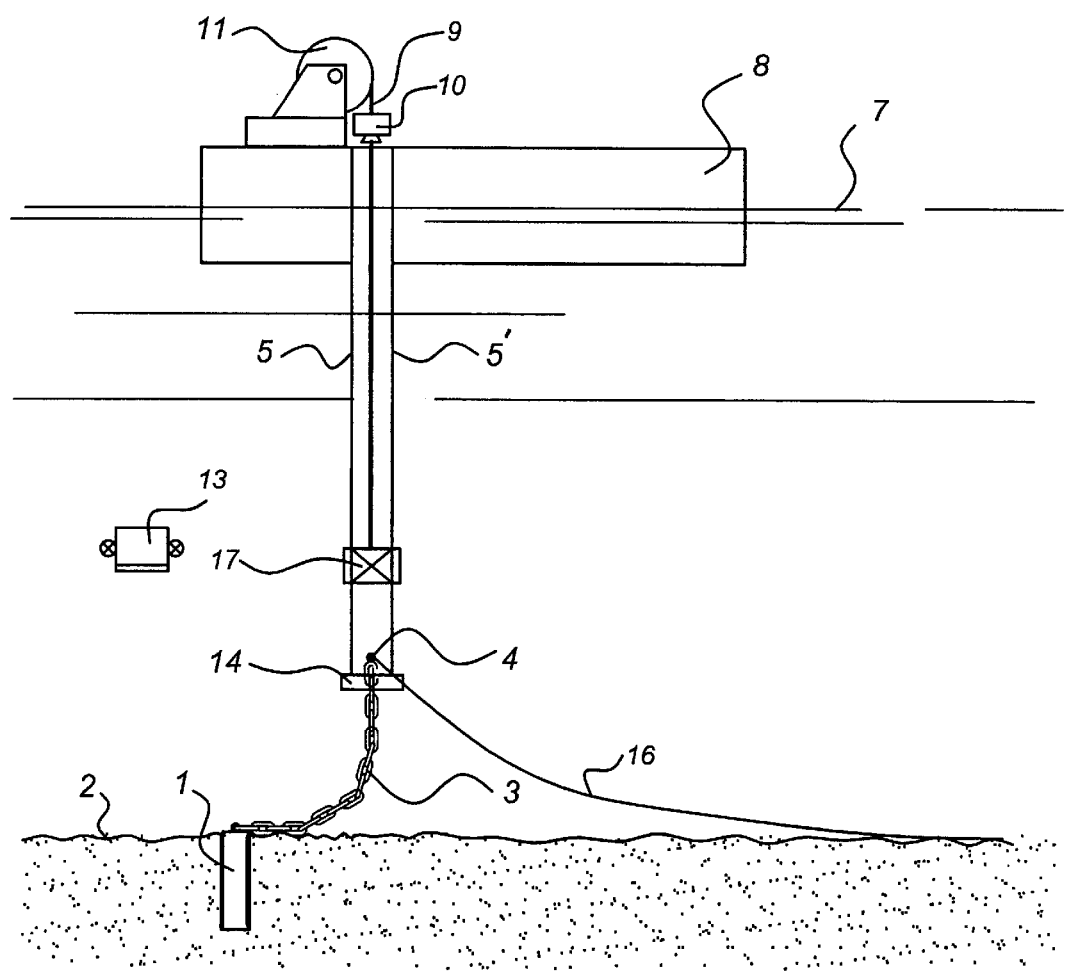

FIG. 4 shows an anchor line repair or exchange method in which an existing damaged or broken multi-strand mooring line 16 needs to be replaced. The chain section 3 is clamped in the workbench 14. A chain cutter 17 is lowered along the guidewires 5, 5' towards the workbench 14 for cutting off the anchor line 16 from the chain section 3. Thereafter the cutter 17 is raised and is recovered on the vessel 8. Then a connector 10 is lowered under control of ROV 13 for attachment of the new mooring line 9 to the end of chain section 3. In stead of cutting off a chain link to remove the multi-strand anchor line 16, it is also possible to cut through the anchor line 16 or to leave the damaged or worn multi-strand anchor line 16 in place while a new anchor line is attached.

An alternative anchor line exchange method comprises attaching a buoy to the chain section 3 by the ROV 13, and cutting the chain section off the anchor line 16 with a cutting tool on the ROV 13. Then the procedure described with respect to FIG. 2 can be followed.

Figure 5:
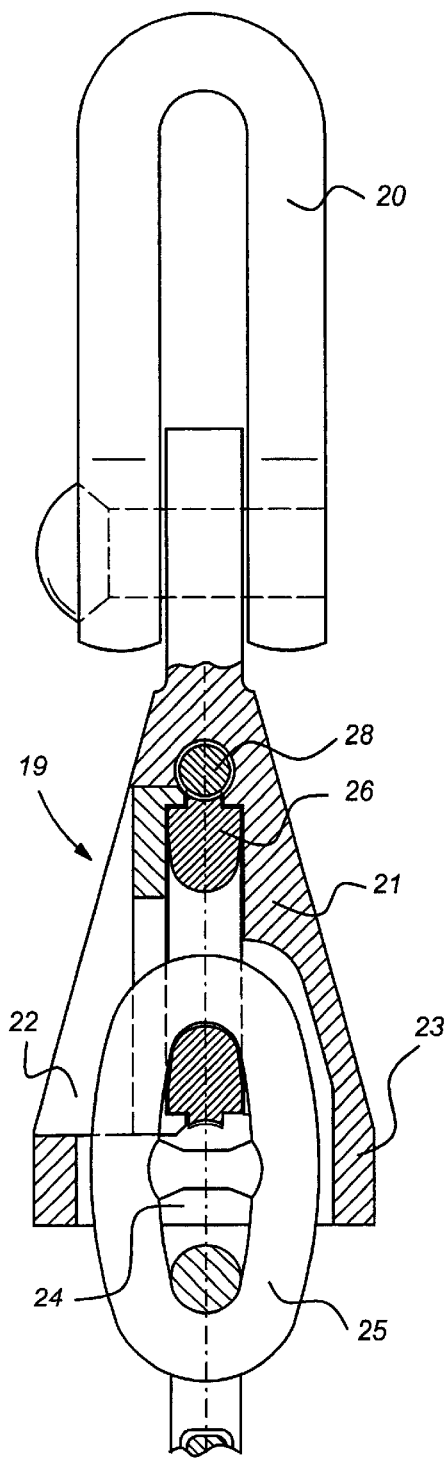

FIG. 5 shows a sideview of a first type of subsea connector 19, comprising a shackle 20 for connection to a multi-strand line and a connector body 21 having two wall parts 22, 23 defining a recess 24 for receiving a chain link 25. The rotatable closing member 26 can be rotated within the housing 21 via a spindle 28 to lock the chain link 25.

Figure 6:
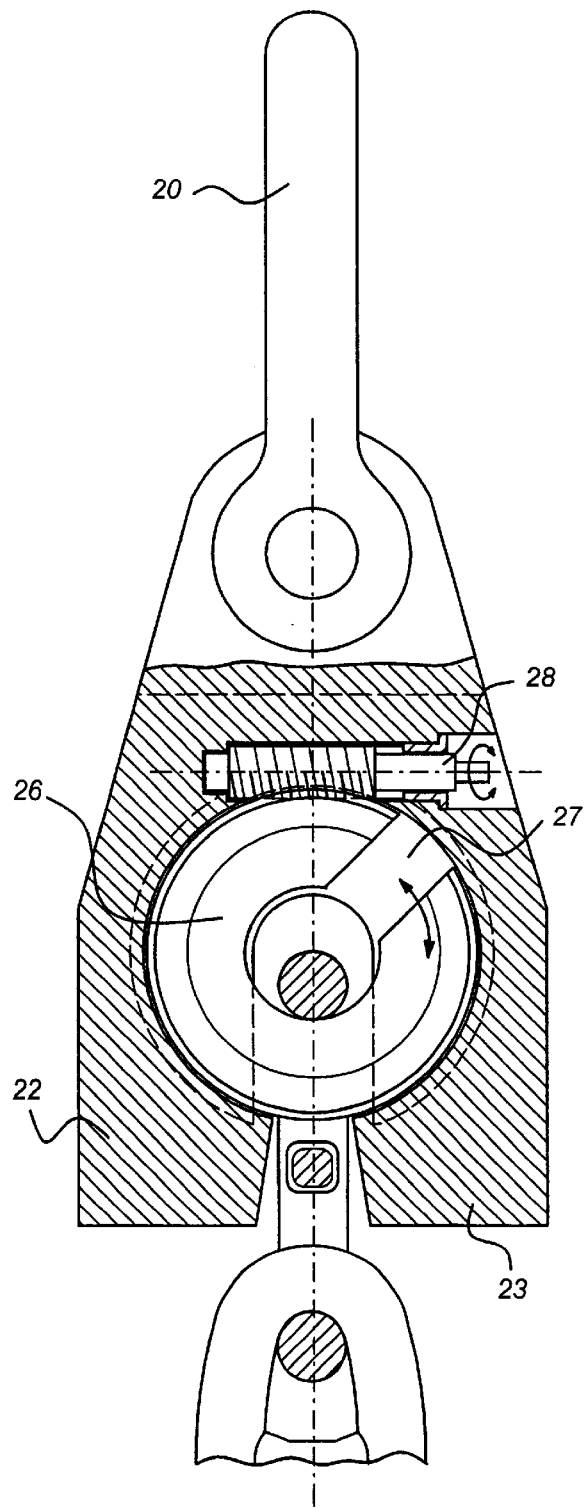

As is shown in FIG. 6, the closing member 26 may comprise a ring-shaped element with a radial groove 27. The closing member 26 may be rotated by rotation of the spindle 28 which engages with a screw thread on the circumference of the closing member 26. The spindle 28 may be operated by a ROV.

FIGS. 7 and 8 show a second embodiment of a subsea connector 29 comprising a shackle 30 and a housing 31 having two wall parts 32, 33 defining a recess for accommodating a chain link 36. A slidable pawl 34 can be moved within the housing 31 to bridge the space between the wall parts 32, 33 to penetrate the upper chain link 36. The pawl 34 can be hydraulically actuated from the installation vessel or can be hydraulically or mechanically actuated from a ROV.

What is claimed is:

1. A method of mooring a vessel to a subsea anchoring element (1) which is connected to the seabed, comprising the steps of:

connecting the anchoring element (1) to the seabed, the anchoring element comprising a chain section (3) which is not longer than half the water depth, the chain section being (3) at or near its free end provided with a coupling chain member (4, 25; 26) characterized by the steps of:

providing a lifting member (5, 6, 12, 14) at or near the end of the chain section (3) lifting the coupling chain member (4, 25, 26) from the seabed;

lowering a multi-strand anchor line (9) from a vessel (8), the multi-strand anchor line (9) being at its free end attached to a connector (10), the connector comprising an eye (20, 30) that is attached to the multi-strand line (9), a connector body (21, 31) comprising two spaced apart wall parts (22, 23; 32, 33) that define a recess therebetween for accommodating the chain member (4, 25, 36), and a closing member (26, 34) being movable with respect to the connector body (21, 31), the closing member (26, 34) being slidable to bridge the space between the wall parts (22, 23; 32, 33), and attaching the connector (10) to the coupling chain member (4, 25, 26) by placing the chain member (4, 25, 26) between the wall parts (22, 23, 32, 33) and operating the closing member (26, 34) to bridge the space between the wall parts (22, 23, 32, 33).

2. The method according to claim 1, characterized in that the chain section (3) is connected to a guide wire (5, 5'), which is connected to a vessel (8) or to a buoyancy element (6) at or near the water surface, the connector (10) being lowered along the guide wire (5, 5') to the coupling member (4).

3. The method according to claim 2, wherein the coupling member (4) is attached to a work bench (14) that is suspended from the guide wire (5, 5').

4. The method according to claim 1, wherein the coupling member (4) comprises a chain link.

5. The method according to claim 1, wherein the chain section (3) is at or near its free end connected to a buoyancy element (12), the multi-strand anchor line (9) and the connector (10) being attached to the coupling member (4) via a remotely operated vehicle (13).

6. A method of repairing or exchanging a mooring line in a mooring system comprising a subsea anchoring element (1) which is connected to the seabed, a chain section (3) which is not longer than half the water depth, connected to the anchoring element (1), the chain section being at or near its free end provided with a coupling chain member (4, 25, 36) which is attached to a first multi-strand anchor line (16), characterized by the steps of:

lowering a second multi-strand anchor line (9) from a vessel (8), the second multi-strand line (9) being at its free end attached to a connector (10); and maintaining the coupling chain member (4, 25, 26) spaced at a distance above the seabed via a lifting member (14, 16); and attaching the connector (10) of the second multi-strand line (9) to the coupling chain member (4, 25, 26), the connector comprising an eye (20, 30) that is attached to the second multi-strand line (9), a connector body (21, 31) comprising two spaced apart wall parts (22, 23; 32, 33) that define a recess therebetween for accommodating the coupling chain member (4, 25, 36), and a closing member (26, 34) being movable with respect to the connector body (21, 31), the closing member (26, 34) being slidable to bridge the space between the wall parts (22, 23; 32, 33), and attaching the connector (10) to the coupling chain member (4, 25, 26) by placing the chain member (4, 25, 26) between the wall parts (22, 23, 32, 33) and operating the closing member (26, 34) to bridge the space between the wall parts (22, 23, 32, 33).

7. The method according to claim 6, characterized in that a work bench (14) is lowered along a guide wire (5, 5') the work bench (14) being attached to the chain section (3), a cutting element (17) being lowered along the guide wire (5, 5') to the chain section (3) for cutting the chain section to disconnect the first multi-strand anchor line (16), the connector (10) and the second multi-strand anchor line (9) being lowered and being connected to the chain section (3).

8. The method according to claim 7, characterized in that the connector (10) and the second multi-strand anchor line (9) are lowered along a guide wire (5, 5').

9. The method according to claim 6, characterized in that a buoyancy element is connected to the chain section (3), after which the first multi-strand anchor line (16) is cut off the chain section (3), the connector (10), and the second multi-strand anchor line being connected to the chain section (3) above the buoyancy element.

* * * * *